Figure 1:
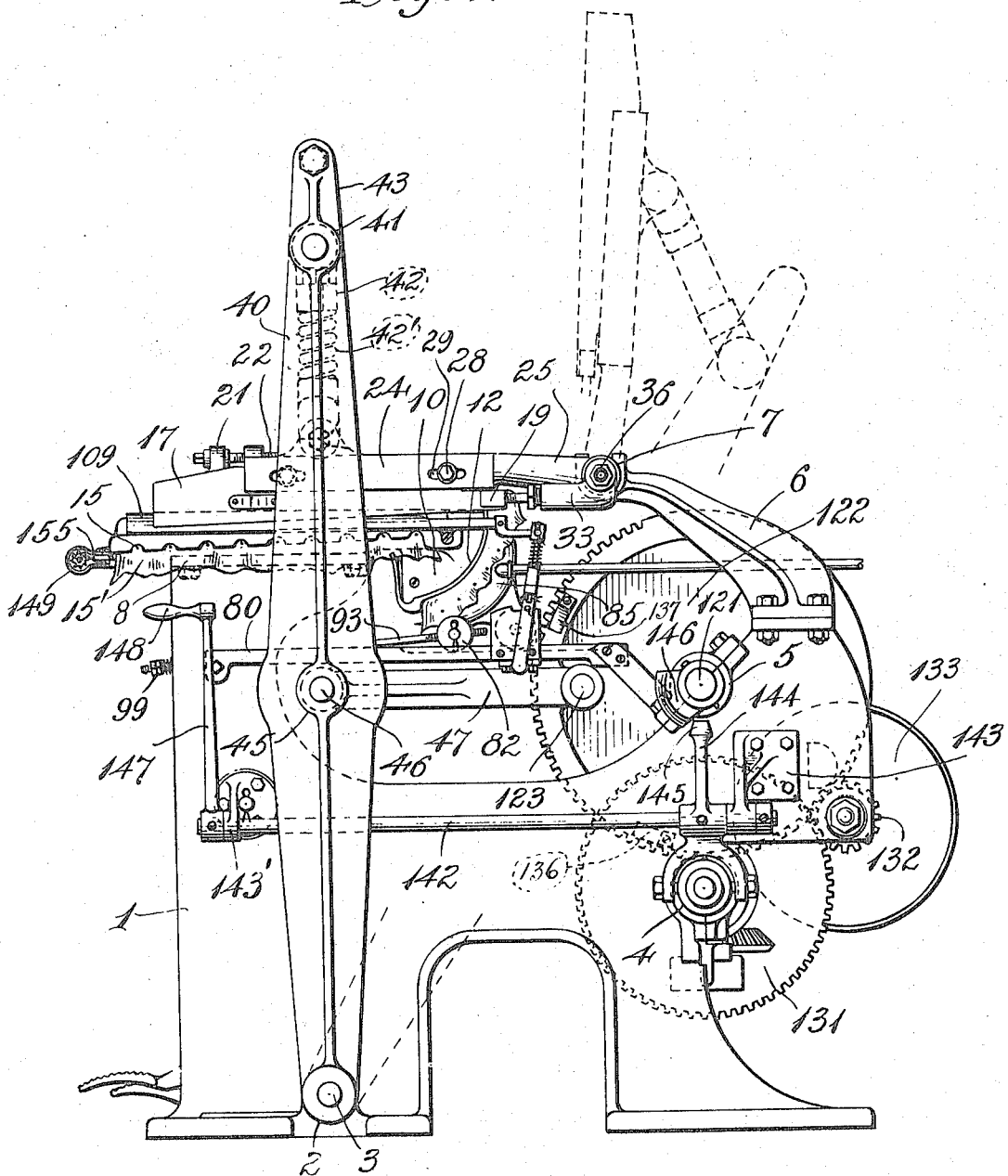

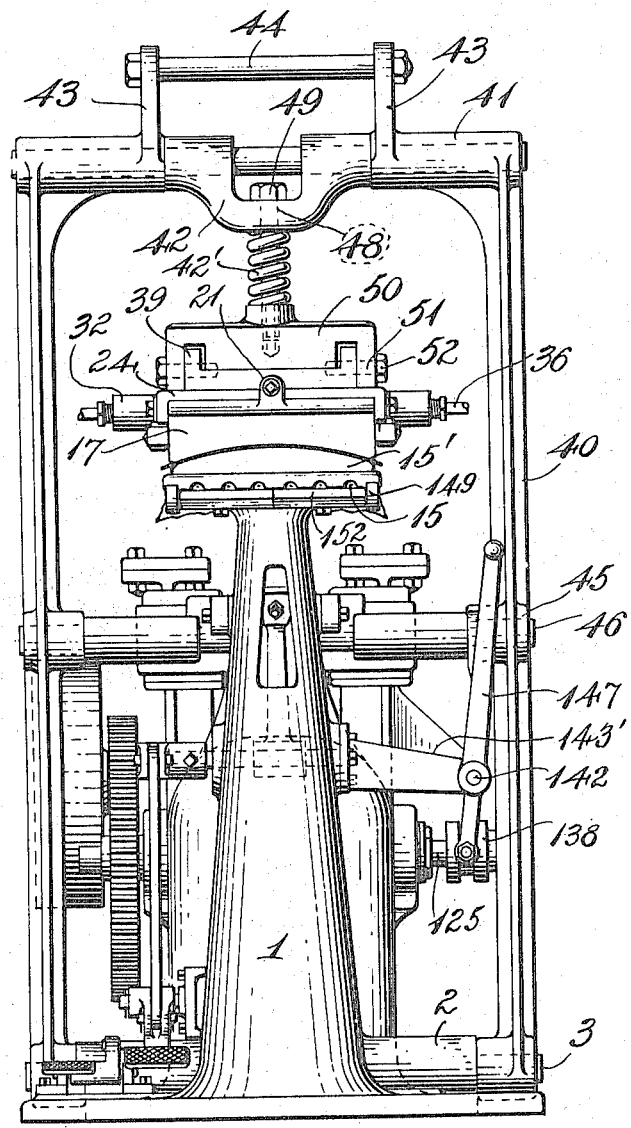

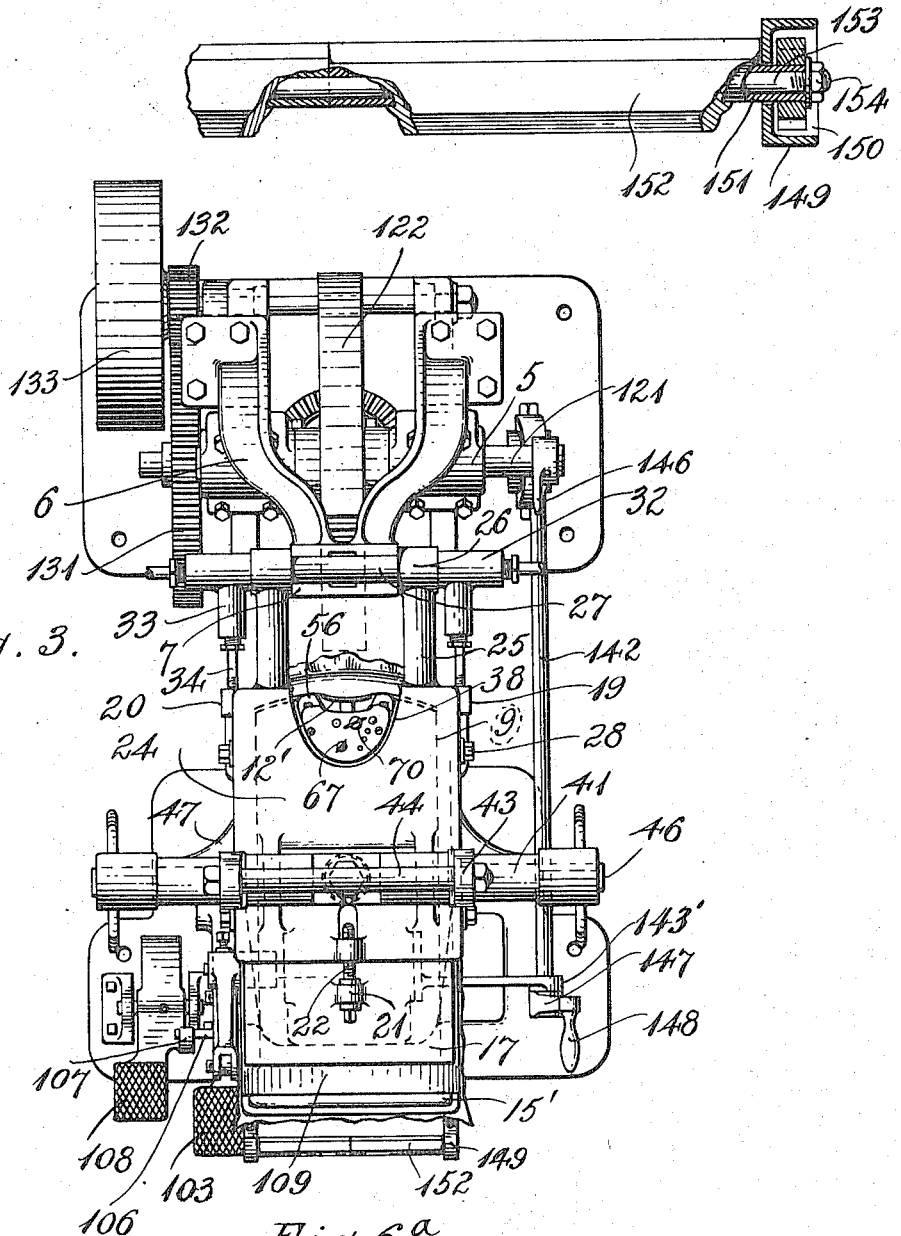

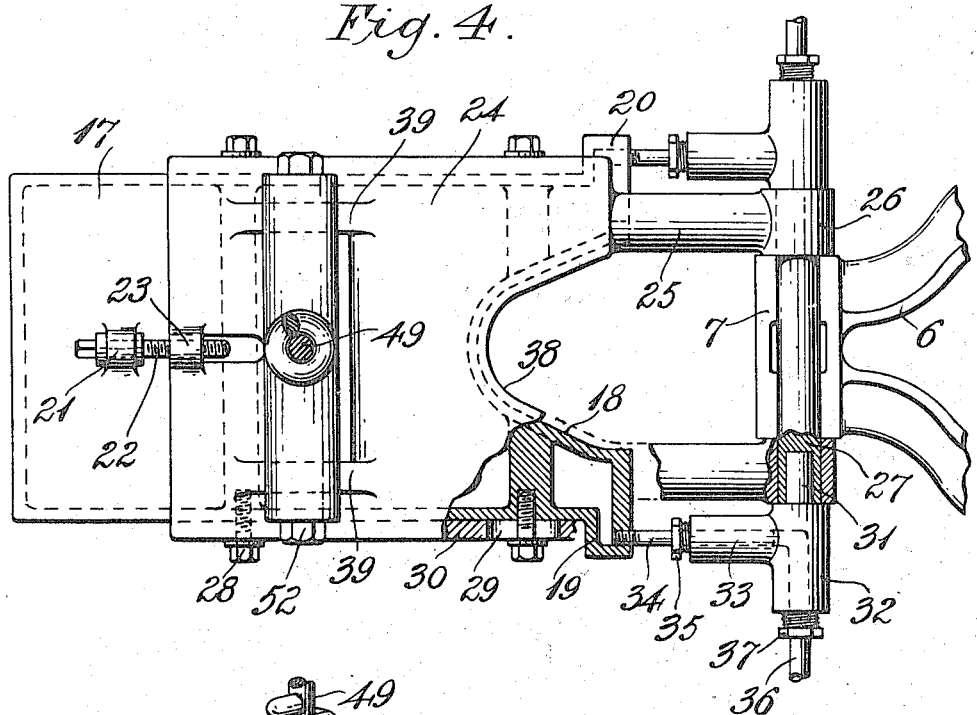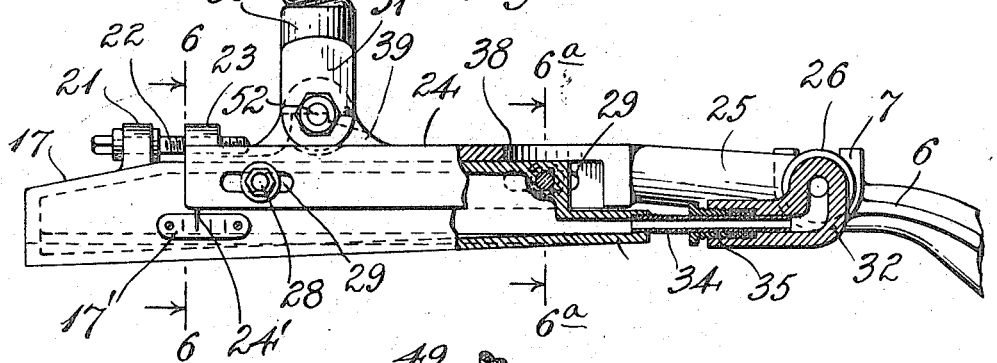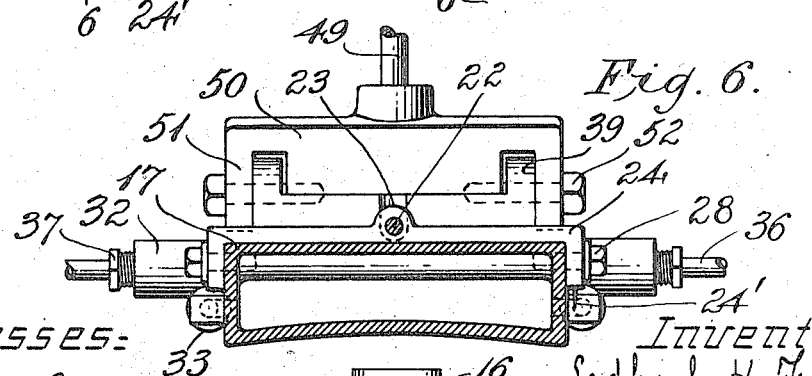

L. H. FREEMAN.
IRONING PRESS.
APPLICATION FILED AUG. 24, 1911.
1,141,181.
Patented June 1, 1915.
7 SHEETS—SHEET 5.
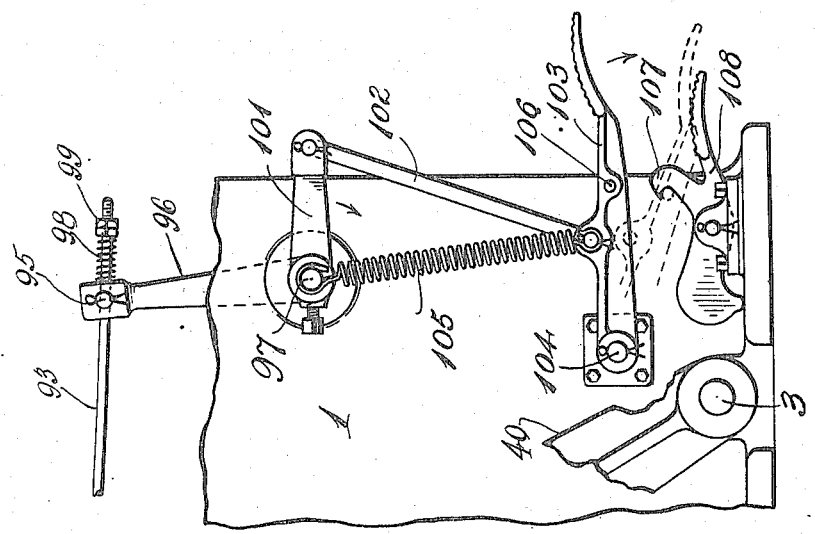
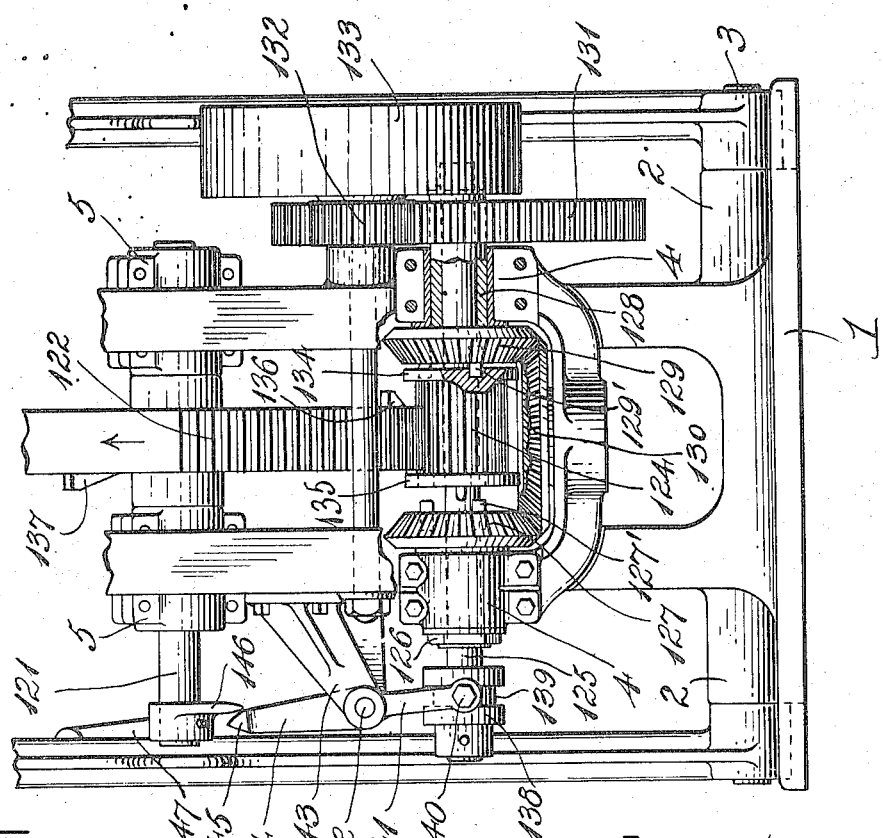

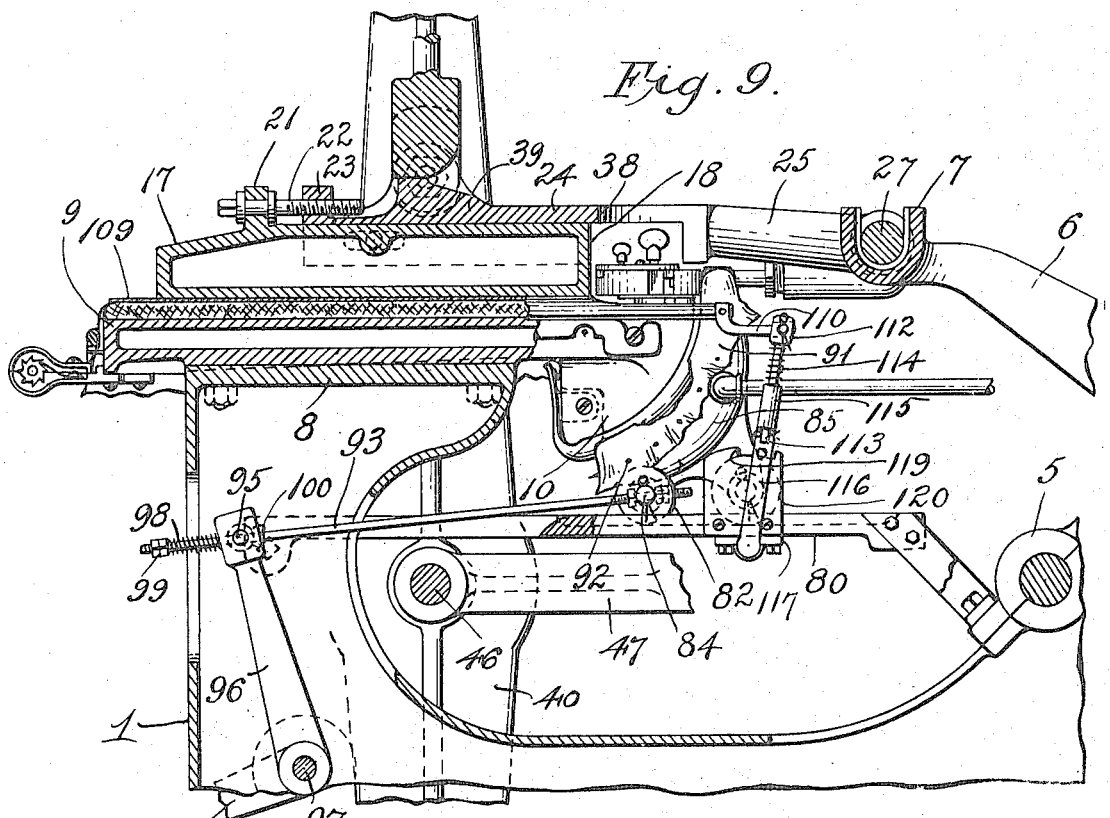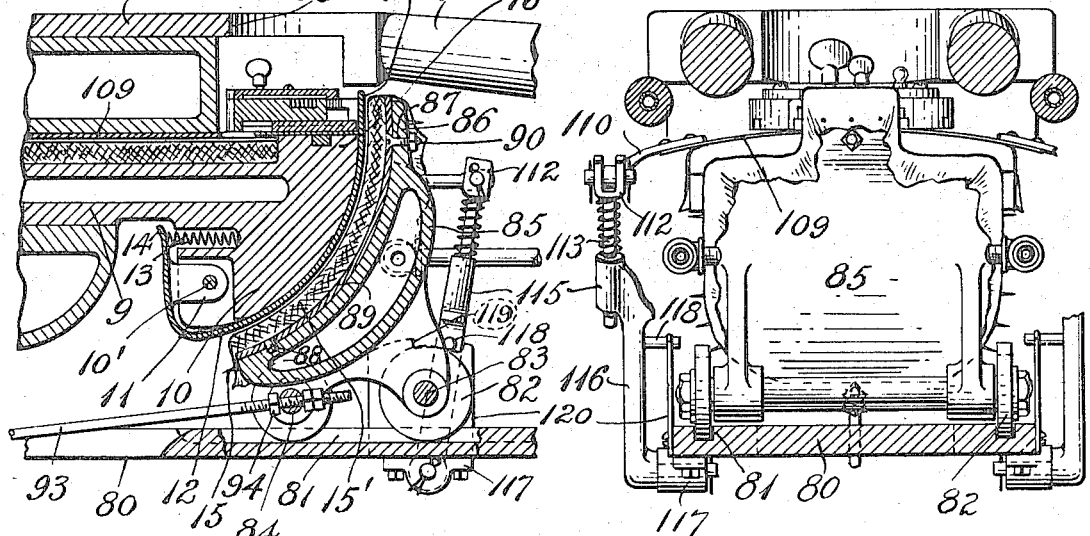

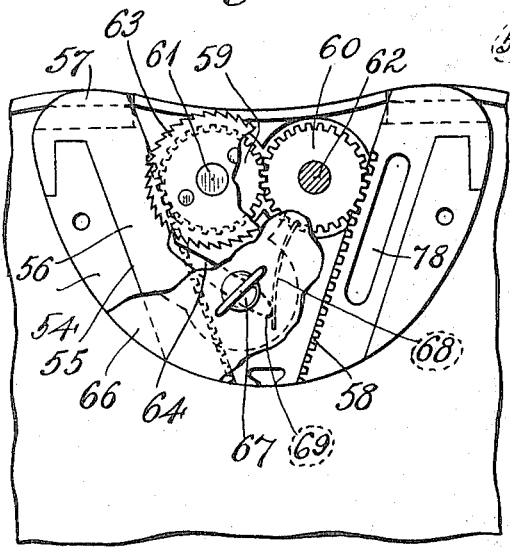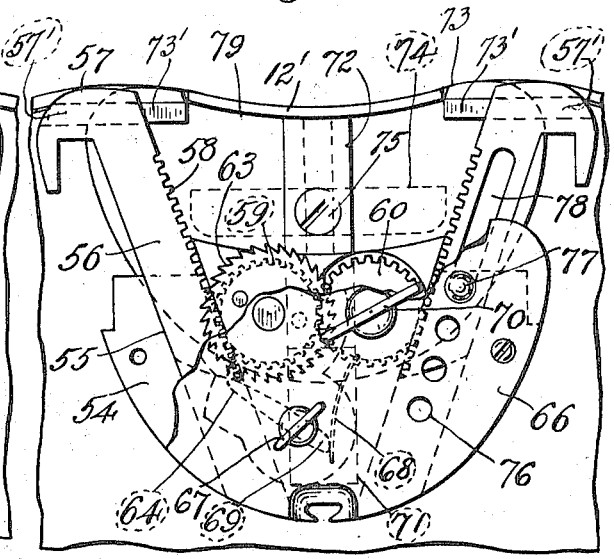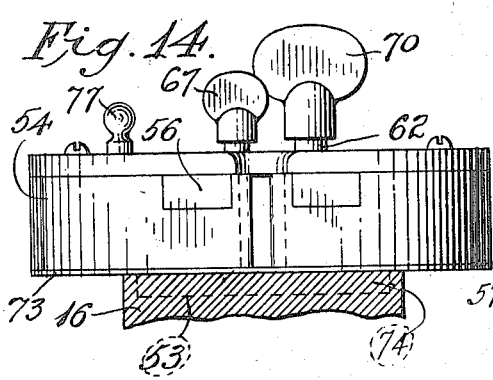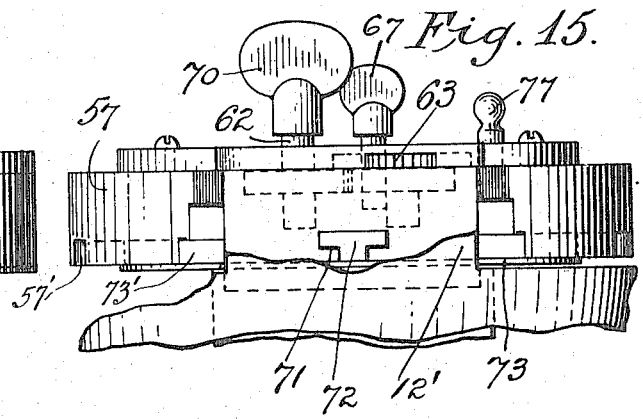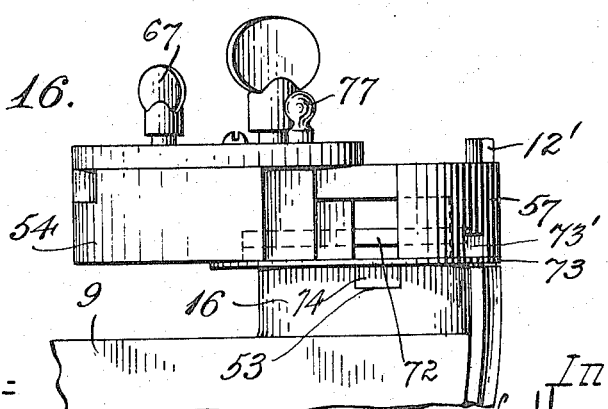

UNITED STATES PATENT OFFICE.

LADBROOK H. FREEMAN, OF CLEVELAND, OHIO, ASSIGNOR TO THE GUGGENHEIM LAUNDRY MACHINERY COMPANY, OF CLEVELAND, OHIO, A CORPORATION OF OHIO.

IRONING-PRESS.

1,141,181.  Specification of Letters Patent.  Patented June 1, 1915.

Application filed August 24, 1911. Serial No. 645,737.

*To all whom it may concern:*

Be it known that I, LADBROOK H. FREEMAN, a citizen of the United States, residing at Cleveland, in the county of Cuyahoga and State of Ohio, have invented certain new and useful Improvements in Ironing-Presses, of which the following is a specification.

This invention relates generally to laundry machinery and particularly to that class of such devices utilized in ironing and pressing shirt bosoms and yokes.

More specifically the invention relates to a shirt press comprising an internal ironing member and an external ironing member adapted to close upon the internal ironing member; to mechanism for ironing the yoke; to mechanism for adjusting the movable ironing member to the different sizes of shirt fronts; and to suitable mechanism for operating the several parts and for preventing the throwing out of the driving mechanism during the movement of the external ironing member.

The invention still further resides in certain details of construction hereinafter set forth in the following description, drawings and claims.

Referring to the drawings, Figure 1 is a side elevation of the machine; Fig. 2 is a front elevation; Fig. 3 is a top plan; Fig. 3ª is a detail view partly in section showing the bosom stretcher; Fig. 4 is an enlarged detail top plan of the upper ironing member; Fig. 5 is a side elevation of the same part of the machine, with parts broken away; Fig. 6 is a section upon the line 6—6 of Fig. 5; Fig. 6ª is a section upon the line 6ª—6ª of Fig. 5; Fig. 7 is a rear elevation of a portion of the machine showing the driving mechanism and clutch mechanism; Fig. 8 is a detail view of the treadle mechanism for operating the yoke ironer; Fig. 9 is a sectional view of the main part of the machine; Fig. 10 is a detail view in section of the yoke ironer and associated parts; Fig. 11 is a rear elevation of the same; Fig. 12 is a top plan view of the neck band former with parts broken away; Fig. 13 is a similar view with the parts distended; Fig. 14 is a front elevation of the neck band former; Fig. 15 is a rear elevation with the parts distended; and Fig. 16 is a side elevation with the parts distended.

In carrying out the invention any form and construction of parts may be employed, but I have shown one form in the drawings which is highly effective, and in such embodiment the several parts will be taken up in a manner to disclose their functions and operations.

*Frame.*—The frame 1 is of any preferred construction, and is provided with suitable bosses 2 which receive pins 3 upon which the external ironing member frame is mounted. The frame is also provided with suitable bearings 4 which receive a counter shaft to be described, bearings 5 for receiving the main operating gear shaft, a bracket 6 provided with open-ended bearings 7 for receiving the trunnions of the external ironing member, and a bed plate member 8 for receiving the internal ironing member. The main frame is also provided with other brackets and bearings which will be taken up in connection with the particular mechanisms as they are described.

*Ironing members.*—Secured upon the bed portion 8, shown in dotted lines in Fig. 1 and partly in full lines in Fig. 2, is the lower ironing member 9 which is hollow and is supplied with steam in any suitable manner. This lower ironing member is provided with an upper surface which is straight near the back end, as shown in section in Fig. 6ª, and gradually curves downward to the edges toward the front end, as shown in section in Fig. 6, the object of this particular form of surface being to cause the bosom to be straight at the neck and to round or arch toward the lower end. Beyond the bed plate portion 8 and toward the rear is a downwardly and forwardly extending yoke ironing portion 10 having an opening therein for a pin 10' pivoted in ears 11 of a yoke ironing plate 12. This yoke ironing plate is of a curved construction, as shown in Figs. 1, 9, 10 and 11, and has a normal tendency to swing toward the yoke ironing portion of the internal ironing member. This tendency is brought about by means of a spring 13 arranged between an upwardly extending tail portion 14 and the yoke ironing portion. The object of this spring tendency will be later described. The main ironing member is provided with suitable pins 15 to which the covering cloth 15' overlying the padding is secured.

The yoke ironing plate is movably secured to the internal yoke ironing member so that when the steam heated yoke ironer is moved toward this plate there will be a tendency for the plate to yield and for the yoke ironer itself to equalize so as to bring about a uniform pressure throughout the ironing surfaces. This equalization is necessary by reason of the fact that in a machine of this character it is impossible to make the padding conform exactly to the internal ironer and to have the plate on the other hand to conform exactly to this ironer in order that these parts may adjust themselves to each other. The function of the spring 13 is to move the ironing portion of the plate 12 into engagement with the internal yoke ironing member so that it will not drop outward of its own weight and cause the yoke of the shirt to bulge before the yoke ironer is in engagement with the work. If this plate were free to move outward then the shirt between it and the yoke ironer would be engaged first and there would be a sliding action between the parts which would cause small folds or wrinkles to occur. Furthermore if this ironing plate had a normal tendency to drop back there would be a tendency for the operator to slip the shirt down between this plate and the internal ironing member, which would, of course, produce a bad result.

On the upper surface of the main ironing member is a projection 16 upon which the neck band former, to be later described, is mounted.

Coöperating with this stationary ironing member is an external or movable ironing member 17, shown in Figs. 1, 2, 3, 4, 5, 6, 6ª and 9, which is in the form of a hollow chest having a neck band recess 18 at its rear end and suitable steam and water extensions 19 and 20 which are near the rear end. This upper ironing member is provided with an ear 21 which receives an adjusting screw 22 swiveled in the ear and having its threaded shank extending into an ear 23 of a supporting frame 24 provided with rearwardly extending shanks 25 carrying sleeves 26 which receive a shaft 27 adapted for engagement in the open-ended socket 7 in the bracket 6. The frame member 24 is secured to the upper ironing member 17 by means of cap screws 28 passing through slots 29 and downwardly extending flanges 30 extending from the frame on either side of the upper ironing member 17. By the arrangement of the upper ironing member in its frame, the ironing member may be adjusted toward and from the supporting bracket 6 by the screw 22 and held in such position by the cap screws 28. The object of this adjustment will be later brought out.

The external or movable ironing member 17 may be provided with a plate 17' having graduations thereon corresponding to the sizes of shirts and coöperating with a suitable indicator point or index point 24' rigidly secured in the supporting frame 24 so that when the external ironing member is adjusted so that this index point is opposite to any one of the lines on the plate, the curved portion of this external ironing member will fit snugly at the base of the neck band when the shirt is properly arranged in place upon the internal ironing member.

The shaft 27 is provided with an opening for receiving a shank 31 of a steam connection 32 which has an arm 33 projecting at right angles to the main portion 32 and receiving within it a pipe 34 screwed or otherwise secured in one of the extensions 19 and 20. A suitable stuffing box 35 is secured in the arm 33 for preventing any leakage about the pipe 34 as it is moved in and out with respect to the connection 32. A suitable pipe 36 enters through a stuffing box 37 into the main portion 32 of the connection. There is one of these steam connections on the outside of each of the sleeves 26 and they permit steam to pass into and out of the external or movable ironing member, and the sliding pipe connection 34 permits the adjustment of the ironing member with respect to its supporting frame 24.

The supporting frame 24 is cut out at 38 to correspond to the movable ironing member and is provided upon its top with ears 39 which connect with the raising and lowering mechanism.

The raising and lowering mechanism for the movable ironing member consists of a framework comprising side bars 40 pivoted upon the pins 3 at the bottom and having sleeve portions 41 at the top arranged on either side of a yoke member 42, the two bars being secured together by means of ears 43 which receive a through bolt 44 which is drawn up tightly to hold the bars 40 in position. Each of these bars 40 is provided intermediate its length with a boss 45 having an opening in the same for receiving a transverse shaft 46 which receive links 47 connected to a driving gear to be described in connection with the driving mechanism.

The yoke member 42 is provided with an opening 48, shown in dotted lines in Fig. 2, which receives loosely a bolt 49 rigidly secured in a connecting block 50 provided with suitable ears 51 receiving bolts 52 passing through the ears 39 and into the block beyond the ears. By this connection the movable ironing member is swung upon the shaft 27 in the socket 7 so that it moves up and down toward the stationary ironing member. It will also be seen that when padding is applied to the lower ironing member and is of sufficient thickness the movable ironing member after it is lowered upon the stationary ironing member is brought to bear against the padded surface, upon which the shirt bosom is placed, by a spring pressure caused by engagement of the yoke 42 with the spring 42'.

*Neck band forming mechanism.*—The projection 16 near the rear end of the internal ironing member is provided with a transverse recess 53 and it is upon this projection that the neck band forming mechanism is mounted.

The neck band forming mechanism is shown in detail in Figs. 9 to 16 inclusive. This mechanism comprises a frame 54 curved upon its front edge to conform to the curve of the front of the neck band and is provided with diagonally disposed guideways 55 extending from the front to the rear outer corners. In these guideways 55 are sliding blocks 56 each provided with a curved shoe 57 at its rear end and with rack teeth 58 upon its inner edge. These rack teeth mesh with gears 59 and 60 pivoted upon pins 61 and 62 and arranged so that they intermesh whereby upon the rotation of one of the gears the frame 54 on the blocks 56 is moved and the parts properly located. In order to prevent the movement of the shoe portions 57 and the blocks 56 with the frame 54 and longitudinally of the lower ironing member 9, the shoes are provided with transverse recesses 57' engaging elongated projections 73' secured to the plate 73. Secured to the shaft or pin 61 is a ratchet wheel 63 adapted to coöperate with a suitable pawl 64 mounted upon a pin 65 and extending through an upper plate 66 and having rigid upon the end thereof a suitable thumb piece 67. The plate 66 is secured to the top of the frame 54. A spring 68, shown in dotted lines in Fig. 12, and engaging a tail portion 69 of the pawl 64, tends to normally hold the pawl either in engagement with the ratchet wheel or out of such engagement, depending upon the position of the tail portion 69 with respect to the spring. A suitable thumb piece 70 mounted upon the pin 62 serves as a means for rotating the gears 59 and 60. On the underside of the frame 54 is a longitudinally disposed T-shaped groove 71 which receives a T-shaped block 72 secured to a plate 73 which in turn is provided with a transverse strip 74, shown in dotted lines in Fig. 13, for engagement in the transverse recess 53 in the projection 16 of the internal ironing member. This lower plate 73 and the guiding block 72 are secured to the projection 16 by means of a screw 75 passing through the parts and into the projection.

By the arrangement of the foregoing it will be seen that when the neck band forming mechanism is secured upon the projection 16 and the operator wishes to adjust the former to any desired neck band, he rotates the pin 65 in a counter clockwise direction in order to insure that the pawl 64 is out of engagement with the ratchet wheel 63. He then rotates the pin 62 by means of the thumb piece 70 causing the gears 59 and 60 to travel along the racks 58 and thereby moving the frame 54 with its curved front edge against the front portion of the neck band. The pawl 64 may then be thrown into engagement with the ratchet wheel 63 and the neck band former will be held in its adjusted position.

Since this neck band former is utilized in the machine as set forth wherein the upper ironing member must be adjusted to different sizes of shirts, this neck band former must be adjusted so as to insure the edge of the external or ironing member engaging the edge of the bosom adjacent the neck band at all times and at the same time avoid the disaster which would result if the neck band former were adjusted out too far into the path of the external or movable ironing member. This is taken care of by an adjustment in the neck band former itself. The upper plate 66 is provided with openings 76 arranged at equal distances from each other and extending in a diagonal arrangement above one of the guide blocks 56. These openings 76 receive a pin 77 which is adapted to extend beyond the under face of the plate 66 and into a slot 78 in the upper face of the right-hand guide block 56, as shown in Figs. 12 and 13. The end of this slot is so located that when the pin 77 is in the opening 76 near the front edge of the neck band former the former may only be open to an extent corresponding to a number fifteen neck band. When the pin is in the next adjacent opening the neck band former may be open for a sixteen neck band, etc. Suitable graduations may be provided upon the upper plate adjacent the openings to give the proper indication to the operator.

The back portion of the neck band former is curved and recessed at 79 to receive a projection 12' of the yoke ironing plate 12 when it is forced against the yoke ironing portion of the internal ironing member by the yoke ironing mechanism to be described. The bottom of this recess 79 and the curve of the projection 12' is such as to form the curve which is prevalent in neck bands of what are termed "Manhattan" shirts.

*Yoke ironing mechanism.*—This mechanism comprises a supporting plate 80 secured to the frame in any suitable manner and having in the upper face thereof suitable guideways 81, shown in dotted lines in Fig. 9, and in full lines in Figs. 10 and 11, and receiving rollers 82 mounted upon axles 83 and 84 in turn mounted in suitable ears carried by a hollow yoke ironing member 85 which has a curved concave front face conforming substantially to the configuration of the yoke ironing plate 12. The opening in this hollow yoke ironing member is supplied with steam or any other heating medium in any suitable manner. Extending forward near the upper portion of this yoke ironing member is a plate portion 86 provided with an opening 87 for a purpose to be described. Extending from the front face and near the lower end of the yoke ironing member is a pin 88 adapted to fit into a suitable opening in a padding plate 89 secured near its upper end to the yoke ironing member by means of a bolt 90 passing through the opening 87. Padding is held in place upon this padding plate 89 by means of cloth 91 which is secured to suitable pins 92 at suitable points on the back and edge of the yoke ironing member. When this padding is covered in this way, the yoke ironer conforms nicely to the configuration of the yoke ironing plate 12. The upwardly extending projection 86 and the corresponding projection of the padding plate and padding serves to engage the projection 12' of the yoke ironing plate so that the rear portion of the collar band is forced in against the projection 12' of the yoke ironing plate to form the curve in the back of the neck band in what is termed and what has been referred to as the "Manhattan" shape. Suitable mechanism is provided for moving the yoke ironer toward and from the yoke ironing plate, and it consists of a rod 93 passing through an opening in the axle 84 and held against endwise movement by suitable nuts 94. This rod 93 passes through an opening in the frame into the forward portion thereof and thence through an opening in a pin 95 carried by a lever 96 pivoted upon a pin 97 secured in the frame. A spring 98 surrounds the projected end of the rod 93 beyond the lever 96 and is forced against the pin 95 by means of suitable nuts 99. A stop 100 is secured to the rod and is engaged by the pin 95 in the rearward movement of the lever 96 to bring about the backward movement of the yoke ironing member. Secured upon the end of the shaft 97 and outside of the frame is an arm 101. Secured to the frame and normally held in an upper position by a spring 105 is a foot lever 103. This lever is provided with a pin 106 adapted for engagement with a hook 107 carried by a weighted treadle 108, the operation of this weighted treadle being such to cause the hook 107 to engage the pin 106 when the treadle 103 is moved downward and to hold the yoke ironer against the work, it being held in such position with a yielding pressure through the engagement of the pin 95 with the spring 98.

*Ironing plate.*—A suitable ironing plate 109 is provided, as shown in Figs. 9 and 10, and it is of substantially the configuration of the ironing members with a suitable cutaway portion to receive the neck band former, and it is supported at its rear end on arms 110 having eyes pivotally mounted in blocks 112 which are provided with pins 113 extending through coil springs 114, and each of the pins 113 is slidably mounted in a sleeve portion 115 carried by arm 116 pivoted in a suitable bearing 117 secured to the supporting plate 80. The arrangement of this mechanism is such that the ironing plate may be shifted back and forth upon the stationary ironing member so that its edge is against the neck band when the shirt bosom is arranged upon the internal ironing member and it is limited in its backward and forward movement by means of a pin 118 secured to the inside of each of the arms 116 engaging in a recess 119 in a plate 120 secured to the edge of the supporting plate 80. There is one of these on each side of the machine for the two arms 116.

*Driving mechanism.*—This mechanism comprises a main driving shaft 121 mounted in the bearings 5 having secured thereto between the bearings 5 a mutilated gear 122 provided with a pin 123 which receives the ends of the links 47 one at each side of the gear connected to the side frame members 40. Only a portion of the periphery of this gear 122 is provided with teeth and these teeth mesh with a driving pinion 124 rigidly keyed upon a shaft 125. This shaft passes loosely through a hub 126 of a bevel pinion 127 in the left bearing 4 and through a sleeve hub 128 of a bevel pinion 129 in the right bearing 4. These two pinions 127 and 129 mesh with a beveled gear 130 mounted upon a stud secured in the frame. Keyed to the sleeve hub 128 is a gear 131 which meshes with a pinion 132 rigid with the driving pulley 133. The pinion 127 is provided with clutch teeth 127' and the bevel pinion 129 is provided with clutch teeth 129', and these clutch teeth coöperate with suitable sockets in the end faces of the driving pinion 124. The ends of this driving pinion are both provided with flanges 134 and 135 projecting within the periphery of the gear 122. These flanges 134 and 135 are adapted to be engaged by cams 136 and 137 respectively and it is these cams which release the pinion from its engagement with one or the other of the pinions 127 and 129 at the proper step in the cycle of operation of the machine. When the pinion 124 stands in the center out of engagement with either of the sets of pins 127' and 129' the parts are at a state of rest, and suitable mechanism is provided for shifting this pinion through the shaft 125 and this is accomplished by the following mechanism: Pinned to the extending end of the shaft 125 is a collar 138 having a groove 139 therein which receives pins 140 carried by the end of a lever 141 pivoted upon a shaft 142 mounted in brackets 143 and 143'. This lever 141 is provided with an upwardly extending arm 144 having a beveled free upper end 145 which engages with a segment 146 keyed to the shaft 121, the object of this arrangement being given later. The forward end of this shaft 142 extends beyond its bracket 143′ and is there provided with a lever 147 having a handle 148 thereon at a convenient place with respect to the parts of the machine so that the operator may manipulate it handily. When the ironing members are closed and the parts are at a state of rest, the segment 146 is out of engagement and out of the path of the arm 144 so that the arm may be rocked back and forth and the operator may rock the shaft 142, and in that way shift the shaft 125 to cause the pinion 124 to engage the proper set of teeth to bring about the raising of the external ironing member, and after this engagement has been brought about and the parts have started operating, the segment 146 moves on one side of the beveled end 145 and locks the shaft 142 against operation and thereby holds the pinion in operative raising position until the segment 146 moves out of the path of the arm 144 when the pinion may be shifted by one of the cams 136 and 137, thus causing the machine to assume a state of rest.

*Work tightener.*—In order to tighten the work upon the stationary ironing member a suitable tightener is provided and it comprises two brackets 149 one secured on each edge of the internal ironing member and having therein a socket 150 which receives a ratchet wheel keyed to a sleeve 151 which extends through an opening in the corresponding bracket and is fastened inside of a roller 152. There are two of these rollers between the two brackets and they are both mounted on a suitable shaft 153 which is held in place by suitable nuts 154 beyond the ratchet wheels. A spring pawl 155 is secured to each bracket and engages the teeth of its ratchet wheel. In using the device, the operator folds the two portions of the split front shirt under the roller and causes the two portions to be wound upon the respective rollers, thereby drawing and stretching the bosom down over the internal ironing member.

*Complete operation.*—Assuming that the parts are in the position shown partly in dotted lines in Fig. 1. The operator first adjusts the external ironing member in its supporting frame to correspond with the proper size of shirts which are being ironed, so that the upper edge of the curved portion of the external ironing member will fit snugly in about the edge of the neck band. The operator then places a shirt over the stationary ironing member making sure to draw the back of the shirt at the yoke down tightly over the yoke ironing plate 12 with the neck band over and around the neck band former. The neck band former, which has been set by means of the pin 77 to open up an amount to correspond with the particular sized neck band of the shirt, is then opened so as to fill the neck band tightly and the two front portions of the shirt, if the shirt be a split bosom, are then drawn over and around the tightening rollers on the front end of the stationary ironing member, and the two halves are stretched tightly over the internal ironing member. The ironing plate which has been raised against the movable ironing member is then lowered upon the bosom and the operator shifts the lever 147 to the left causing the shaft 125 and the pinion 124 to be shifted to the left into engagement with the clutch teeth 127′ when the gear 122 will rotate in a clockwise direction into the position shown in Fig. 1. In the meantime, the external ironing member has been lowered upon the work and compression is brought about by the final movement of the gear through the links 47. In the meantime, however, the beveled segment 146 has been traveling on the left side of the lever 144 and has been holding it against movement so that the pinion 124 is locked in the closing driving position. As the links 47 approach the horizontal position or when the ironing members are being tightly compressed, the cam 136 approaches the flange 134 and shifts the pinion 124 to the right into a neutral position when the parts will be at a state of rest. In the meantime, the segment 146 has moved out of the path of the arm 144 and when the bosom has been completely pressed, the operator then shifts the lever 147 to the right causing the pinion 124 to engage the clutch teeth 129′ when the drive causes the gear 122 to be rotated in a counter clockwise direction and the frame carrying the external ironing member is moved to the rear and is raised from the work. The locking arm 144 is also held against movement during this operation by the same segment 146.

It will be seen, by having the forward portion of the neck band former adjustable and the rear foot portions held against movement longitudinal of the board and mounted at the neck band end thereof, and by having the ironing surface of the internal yoke ironing portion of the board meet the ironing surface of the board itself at substantially the line forming the neck band end of the board, and by having the chest co-extensive with the board and the yoke ironer press the yoke up to this line, that a folding line touching the back curve of the neck band will be established in the finished shirts, so that the finished article will fold nicely without any additional operation by hand. It will also be seen that as the neck band former is adjusted and the foot portions or wings are moved laterally, the planes touching the sides of the forward curved portion and the sides of the foot portions will be in parallelism with the diverging sides of the neck band recess in the chest.

Having described my invention, I claim:—

1. In a laundry press, an internal ironing member, a neck band former structure comprising a front curved portion and rear foot portions, means for adjusting the parts of the neck band former for various sizes of neck bands, said neck band former being within the end of the internal ironing member throughout the various adjustments, and the foot portions being movable laterally in said adjustments, and an external ironing member co-extensive with the board and having a neck band former recess of substantially V-shape with a curve in the angle corresponding to the curve of the forward curved portion of the neck band former, the side walls of the V-shaped recess being in parallel alinement with planes touching the sides of the forward curved portion and the foot portions in the various adjustments of the neck band former.

2. In an ironing press, means for ironing the bosom and front sides of the shoulders in a substantially unbroken surface, a neck band former, means for ironing the yoke, means for supplying heat to the yoke ironing means and means carried by the yoke ironing means and heated thereby for pressing and ironing an inwardly extending curve into the rear portion of the neck band.

3. In an ironing press, an internal ironing member having a bosom ironing face and a yoke ironing face, a neck band former mounted upon the face of the internal ironing member and adjacent to the yoke ironing face, said neck band former having an inwardly curved back ironing face for the rear portion of the neck band, a yoke ironer coöperating with the yoke ironing face, and a projection carried thereby and conforming to the configuration of the rear curved surface of the neck band former whereby an inwardly extending curve is pressed into the rear portion of the neck band, and means for supplying heat to the several parts.

4. In an ironing press, an internal ironing member having a bosom ironing portion and a yoke ironing portion, and a yoke ironing plate movably mounted upon the yoke ironing portion, an external ironing member, and a yoke ironer coöperating with the yoke ironing plate.

5. In an ironing press, an internal ironing member having a bosom ironing portion and a yoke ironing portion, a yoke ironing plate yieldingly mounted upon the yoke ironing portion, and a yoke ironer coöperating with such ironing plate.

6. In an ironing press, an internal ironing member having a bosom ironing portion and a yoke ironing portion, a yoke ironing plate swiveled to the yoke ironing portion and adapted to swing toward and from such portion, and a yoke ironing member coöperating with said yoke ironing plate.

7. In an ironing press, a frame, an internal ironing member having a bosom ironing portion and a yoke ironing portion curved at the back edge of the internal ironing member and under the same, an external ironing member, a yoke ironing plate swiveled to the lower forward portion of the yoke ironing portion of the internal ironing member, means normally tending to hold the yoke ironing plate in engagement with the yoke ironing portion, and a yoke ironing member coöperating with said yoke ironing plate.

8. In an ironing press, a frame, an internal ironing member mounted thereon and comprising a bosom ironing portion and a yoke ironing portion on the back thereof, said portions meeting each other at the shoulder seam of the shirt, said yoke ironing portion being curved under and toward the front end of the internal ironing member, a yoke ironing plate to conform to the configuration of such yoke ironing portion and swiveled near the lower forward part thereof, a spring normally tending to force said yoke ironing plate toward the surface of the yoke ironing member, a yoke ironer coöperating with said yoke ironing plate, means for operating the several parts, and means for supplying a heating medium to the several parts.

9. In a bosom press, a frame, an internal ironing member, a neck band former carried thereby and comprising a forward curved portion movable longitudinally upon the internal ironing member and rear foot portions fixed against longitudinal movement but movable laterally on the internal ironing member, means for adjusting the neck band former, an external ironing member support movable toward and from the internal ironing member, and an external ironing member carried by the external ironing member support and having a neck band recess, said external ironing member being slidable in the support to adjust the curved edge of the neck band former recess to the forward portion of the neck band former in operating upon various sizes of shirts.

10. In a bosom press, a frame, an internal ironing member, a neck band former carried thereby and comprising a forward curved portion movable longitudinally upon the internal ironing member and rear foot portions fixed against longitudinal movement but movable laterally on the internal ironing member, means for adjusting the neck band former, an external ironing member support movable toward and from the internal ironing member, an external ironing member carried by the external ironing member support and having a neck band recess, said external ironing member being slidable in the support to adjust the curved edge of the neck band former recess to the forward portion of the neck band former in operating upon various sizes of shirts and means for holding it in any adjusted position.

In testimony whereof I affix my signature in presence of two witnesses as follows.

LADBROOK H. FREEMAN.

Witnesses:
C. H. TRESCH,
WM. EDWIN BROOKS.